(No Model.)
P. LETTRÉ.
BRACELET.
No. 290,590. Patented Dec. 18, 1883.
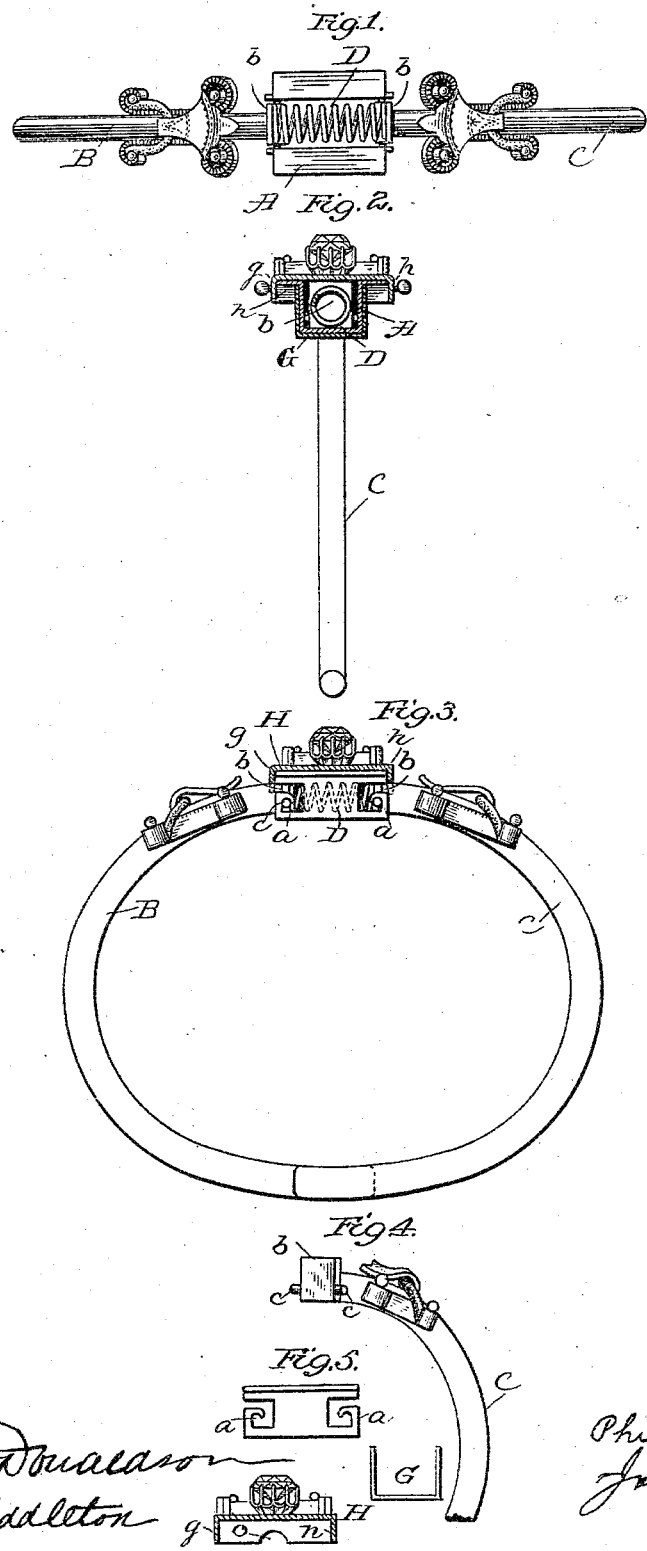
WITNESSES
INVENTOR
Philipp Lettré
Attorneys

UNITED STATES PATENT OFFICE.

PHILIPP LETTRÉ, OF ATTLEBOROUGH, MASSACHUSETTS, ASSIGNOR TO SANDLAND, CAPRON & CO., OF SAME PLACE.

BRACELET.

SPECIFICATION forming part of Letters Patent No. 290,590, dated December 18, 1883.

Application filed June 5, 1883. (No model.)

*To all whom it may concern:*

Be it known that I, PHILIPP LETTRÉ, of Attleborough, in the county of Bristol and State of Massachusetts, have invented a new and useful Improvement in Bracelets; and I do hereby declare that the following is a full, clear, and exact description of the same.

My invention relates to an improvement in self-closing bracelets.

The general construction of my bracelet comprehends a central head or plate, a pair of curved wings pivoted in the head, and a pressure-spring within the head adapted to press the wings outward, and so close them.

The invention consists in the peculiar construction of the bracelet, as fully hereinafter described and claimed.

In the accompanying drawings, Figure 1 is a front elevation with the face-plate removed. Fig. 2 is a cross-section through the center of the head. Fig. 3 is a side elevation with the finishing-plate removed, to show the manner of pivoting the wings. Fig. 4 is a perspective detail view of one of the wings of the bracelet. Fig. 5 represents details.

In these drawings, A represents the head of the bracelet, to which the wings are attached. This head consists of a plate of sheet metal formed into a flat blank and bent into the channel shape shown in Fig. 2. In the ends of the head are formed bearings *a a*, made by cutting a strip of angular form from the metal of the blank. The wings B C are formed from precious or base metal, and are of such length that when closed they overlap some distance at their free ends. These wings are pivoted in the head by means of a plate, *b*, attached to the end of the wing and provided with short journals *c c* at their lower corners. These journals are slipped into place in the bearings *a a* by means of the angular slot connected therewith, the plate *b* just filling the end of the channel, within which channel it can move freely.

D is a coiled pressure-spring slipped loosely into the channeled head, with its ends resting against the plates *b* of the wings B C, and as such wings are pivoted at their bottom the pressure against the plates gives sufficient leverage to force their opposite ends together, and so close them. The spring D also prevents the journals *c c* from accidentally slipping out of the bearings *a a*.

G, Fig. 5, is a bottom plate formed from a single piece of sheet metal bent to channel shape, and fitted over the bottom of the head A. This plate may, upon its bottom and side faces, be finished in any style desired. Its purpose is to conceal the bearings and rough sides of the head. It may be secured to the head A by a drop of solder.

H is a square ornamental top plate, which incloses the upper portion of the head A, and is soldered thereto. It has downwardly-projecting flanges *g h*, the flanges *h* at the ends having a central recess, *o*, to permit the wings B C to rise. The ornamentation of this portion of the device may be indefinitely varied.

When the parts are in place, it will be seen that the construction is exceedingly compact, as well as simple and cheap.

What I claim is—

1. In a self-closing bracelet, the combination of a head, pivoted wings, and the coiled pressure-spring inclosed entirely within said head, and held in position therein by bearing against the ends of the pivoted wings, substantially as described.

2. In a bracelet, the combination of a head having bearings formed in the single plate which composes such head, wings having plates *b*, provided with journals *c c*, and a coiled pressure-spring, D, substantially as described.

In testimony whereof I have signed my name to this specification in the presence of two subscribing witnesses.

PHILIPP LETTRÉ.

Witnesses:
J. E. POND, Jr.,
E. H. FARNUM.